May 19, 1942.  G. WOMBLE  2,283,481
ADJUSTING CUTTER ASSEMBLY
Filed Nov. 18, 1940
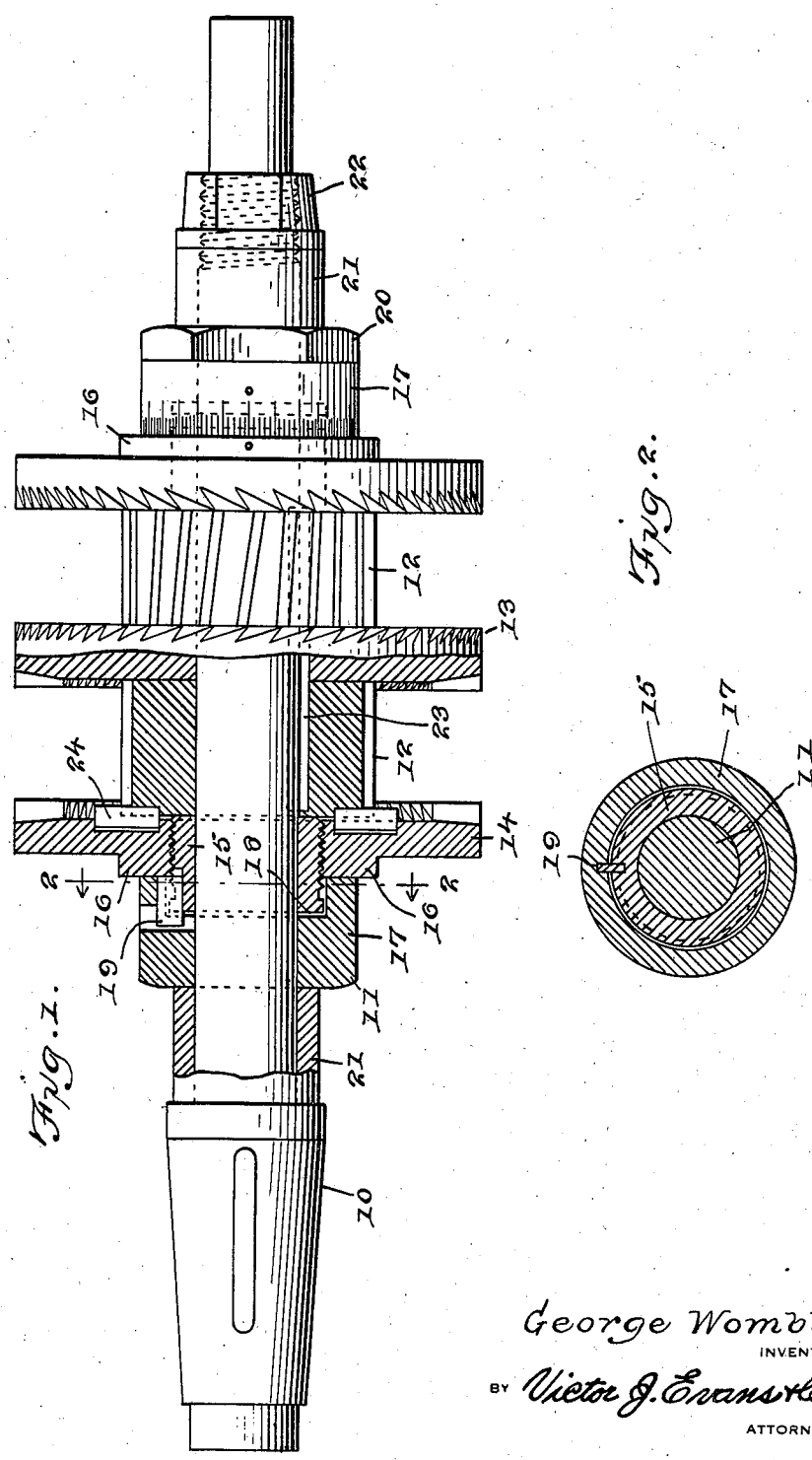
George Womble
INVENTOR
BY Victor J. Evans & Co.
ATTORNEYS Patented May 19, 1942

2,283,481

UNITED STATES PATENT OFFICE 2,283,481

ADJUSTING CUTTER ASSEMBLY

George Womble, Portsmouth, Va.

Application November 18, 1940, Serial No. 366,177

3 Claims. (Cl. 29—103)

This invention relates to cutter adjustments, and more particularly to those for use in milling and cutting machines.

In machines of this type, which consist of a plurality of cutters and surface mills, etc., mounted on an arbor or spindle it is extremely important to obtain the correct position, laterally on the spindle, of each cutter. Various means have been developed to obtain such adjustment but, so far as I am aware, no one has as yet developed an adjusting assembly having the specific advantageous arrangement of parts of that embodied in my invention.

The object of this invention is to obtain accuracy and stability in the axial adjustment of cutters.

Another object is to obtain such an adjustment by means which indicate, inaccurate gradations, the distance of such adjustment.

Another object is simplicity and a lack of superfluity of parts in a device for rendering such adjustment.

These and other objects may be accomplished by my invention which embodies among its features an arbor or spindle shaft, a plurality of cutters thereon, a surface mill thereon with the cutters at the ends of said surface mill, a key between the surface mill and the shaft, axially extending key means between the end surfaces of the surface mill and the faces of the cutters, each cutter being threaded on a bushing fitted revolvably on the shaft, said cutter having a rearwardly extending hub and said bushing extending outside the hub, an adjusting nut revolvably fitted on the shaft and having a recess which permits it to be fitted over the bushing and a key in the recess and bushing which permits the bushing to be rotated by means of the nut, and a sleeve between the nut and an arbor shank or a lock nut to hold the nut in position. There is a scale of gradations on the nut and a corresponding mark on the cutter hub, to gauge the relative rotation therebetween. The cutter adjustment is made by rotating the nut, this turns the bushing and advances or retracts the cutter along the shaft.

Other objects and features may be become evident from the following description when taken in connection with the accompanying drawing in which, Figure 1 is a side view, partly in cross section, of an arbor having surface mills and cutters which are adjustable by my device, and Figure 2 is a cross section taken on line 2—2 of Figure 1.

Referring to the drawing in detail, the arbor consists of a shank 10 and a shaft 11 carrying the surface mills 12, 12, center cutter 13 and end cutters 14, 14. It is the axial adjustment of these end cutters that concerns my invention.

The end cutters are identical in construction and are each mounted on a bushing 15, having a threaded connection therewith, and the cutters have slightly protruding hubs 16. The bushings 15 protrude slightly from the hubs. Nuts 17 are fitted on the shaft and have a recess 18 in their forward end and this recess fits over the bushing 15. A key means 19 is provided between the nut and bushing so that rotation of the nut causes rotation of the bushing. The nut has a wrench-engaging formation as shown at 20 for rotation. Sleeves 21 are placed on the shaft 11 between the nuts and the shank 10 or a lock nut means 22 to provide stability of the entire organization.

Shaft 11 is splined and keyed as at 23 to the interior of surface mills 12, whose ends are provided with key means 24 engaging the inside surfaces of cutters 14. By this means the mills 12 and cutters 14 are positively driven from the shaft and cutters 14 are held from all rotation with respect to the shaft.

Hub 16 and nut 17 are marked with corresponding indicia to indicate the degree of relative rotation. Accordingly, it will be noted that axial adjustment of the cutters 14 is obtained by rotating nuts 17, which in turn rotate bushings 15 and, by reason of the threaded connection therewith, cause axial movement of the cutters 14. By reading the scales on the nuts and hubs, an extreme exactness of adjustment may be obtained.

Although a preferred embodiment of my invention is described herein, I do not wish to be limited thereto but only by the scope of the appended claims.

What is claimed is:

1. In a device of the class described, a cutter assembly including a shaft, an end cutter mounted on the shaft, a surface mill fitted on the shaft and splined thereto, the end surface of said mill being keyed to the end cutter, said end cutter threadedly mounted on a bushing revolvably mounted on the shaft and part of said bushing protruding from said cutter, an adjusting nut revolvably mounted on the shaft and having a recess fitted over the bushing, key means between the nut and the bushing so that when the nut is rotated on the shaft it causes rotation of the bushing with respect to the cutter and axial movement of the cutter.

2. In a device of the class described, a cutter assembly including a shaft, a surface mill fitted on the shaft and splined thereto, an end cutter keyed to the end surface of the mill and threadedly mounted on a bushing, said cutter having a hub, said bushing revolvably mounted on said shaft and protruding from the hub, an adjusting nut revolvably mounted on the shaft and held from axial movement thereon, a recess in the nut extending over the bushing to adjacent said hub, a key in the recess engaging the bushing, and indicia on the nut and hub to indicate relative rotation so that, by this relative rotation, the cutter may be adjusted as to axial position.

3. In a device of the character described, a shaft, a surface mill splined on the said shaft, an exteriorly threaded bushing rotatably mounted on the shaft at one end of the said mill, an end cutter threadedly mounted on the said bushing and keyed to the said mill, a nut rotatably fitted on the shaft and threadedly engaging an extending portion of the bushing, the said nut having a recess therein, and a key fitted in the recess of the nut and engaging the bushing for locking the nut and bushing.

GEORGE WOMBLE.